(12) United States Patent
Cha et al.

(10) Patent No.: US 9,969,861 B2
(45) Date of Patent: May 15, 2018

(54) CARBOXYLIC ACID-MODIFIED NITRILE-BASED COPOLYMER LATEX COMPOSITION AND DIP MOLDED ARTICLE INCLUDING THE SAME

(71) Applicant: LG Chem, Ltd., Seoul (KR)

(72) Inventors: Yu Jin Cha, Daejeon (KR); Jung Eun Kim, Daejeon (KR); Hyun Woo Kim, Daejeon (KR); Ji Hyun Kim, Daejeon (KR)

(73) Assignee: LG Chem, Ltd. (KR)

( * ) Notice: Subject to any disclaimer, the term of this patent is extended or adjusted under 35 U.S.C. 154(b) by 0 days. days.

(21) Appl. No.: 14/429,665

(22) PCT Filed: Aug. 29, 2014

(86) PCT No.: PCT/KR2014/008095
§ 371 (c)(1),
(2) Date: Mar. 19, 2015

(87) PCT Pub. No.: WO2015/030533
PCT Pub. Date: Mar. 5, 2015

(65) Prior Publication Data
US 2015/0232637 A1 Aug. 20, 2015

(30) Foreign Application Priority Data
Aug. 29, 2013 (KR) .................. 10-2013-0103482

(51) Int. Cl.
C08F 220/46 (2006.01)
C08F 236/06 (2006.01)
C08K 3/34 (2006.01)

(52) U.S. Cl.
CPC .................................. C08K 3/346 (2013.01)

(58) Field of Classification Search
CPC .......................... C08F 220/46; C08F 236/12
See application file for complete search history.

(56) References Cited

U.S. PATENT DOCUMENTS

2003/0050377 A1* 3/2003 Hagiwara ............. B29C 41/003
524/418
2011/0229646 A1 9/2011 Kim et al.
2012/0276399 A1 11/2012 Evstatieva et al.
2014/0302265 A1 10/2014 Yang et al.
2014/0323634 A1 10/2014 Kim et al.

FOREIGN PATENT DOCUMENTS

| CN | 102159604 A | 8/2011 | |
|---|---|---|---|
| CN | 102224177 A | 10/2011 | |
| EP | 0524836 A1 | 1/1993 | |
| EP | 1125978 A1 * | 8/2001 | ............. C08J 3/215 |
| JP | 2004051747 A * | 2/2004 | |
| KR | 10-2001-0004466 A | 1/2001 | |
| KR | 10-2012-0083031 A | 7/2012 | |
| KR | 10-2012-0086927 A | 8/2012 | |
| KR | 10-2012-0129367 A | 11/2012 | |
| KR | 20130055334 A | 5/2013 | |
| KR | 20130056505 A | 5/2013 | |
| KR | 20130085015 A | 7/2013 | |
| WO | 2012042543 | 4/2012 | |
| WO | 2013077585 A1 | 5/2013 | |

OTHER PUBLICATIONS

English Translation of JP 2004/051747 A; Matsuura et al; Feb. 2004.*
International Search Report for Application PCT/KR2014/008095 dated Dec. 12, 2014.
Sun, "Peparation of Clays/Nitrile Rubber Nannocomposite Materials and Research on Physical Performance Thereof." CNKI, Engineering Technology vol. I, No. 1, p. 12, Chapter II, Mar. 15, 2004 (English translation of Abstract only).
Office Action from Chinese Application No. 201480045352.7, dated Aug. 29, 2016.

* cited by examiner

Primary Examiner — Karuna P Reddy
(74) Attorney, Agent, or Firm — Lerner, David, Littenberg, Krumholz & Mentlik, LLP

(57) ABSTRACT

The present invention relates to a carboxylic acid-modified nitrile-based copolymer latex composition and a dip molded article including the same, the composition including: a carboxylic acid-modified nitrile-based copolymer latex having a glass transition temperature of −30 to −20° C.; and a bentonite dispersion solution. The dip molded article using the carboxylic acid-modified nitrile-based copolymer latex composition according to the present invention has high tensile strength and excellent wearable sensation, and thus the dip molded article may be usefully applied to dip molded latex articles such as surgical gloves, checkup gloves, a condom, a catheter, industrial gloves, household gloves, or health care articles.

7 Claims, No Drawings

CARBOXYLIC ACID-MODIFIED NITRILE-BASED COPOLYMER LATEX COMPOSITION AND DIP MOLDED ARTICLE INCLUDING THE SAME

CROSS-REFERENCE TO RELATED APPLICATIONS

The present application is a national phase entry under 35 U.S.C. § 371 of International Application No. PCT/KR2014/008095 filed Aug. 29, 2014, which claims priority from Korean Application No. 10-2013-0103482 filed Aug. 29, 2013, all of which are hereby incorporated herein by reference.

TECHNICAL FIELD

The present invention relates to a carboxylic acid-modified nitrile-based copolymer latex composition and a dip molded article including the same.

BACKGROUND ART

Recently, various developments have been conducted in order to improve elasticity of nitrile-based rubber gloves. Particularly, an effort to improve physical properties of the rubber gloves by post-adding various additives to a carboxylic acid-modified nitrile-based copolymer latex for dip molding has been continuously made.

In order to improve physical properties of the rubber gloves, particularly, in a dip molding process, a lot of researches such as a method of increasing a thickness of a carboxylic acid-modified nitrile-based copolymer latex adsorbed on a mold for molding or a method of increasing elasticity of a nitrile-based rubber gloves has been conducted.

In order to increase elasticity of the nitrile-based rubber gloves, particularly, there is a method of changing a component of a latex composition for dip molding by changing constitutional component of the carboxylic acid-modified nitrile-based copolymer latex.

Further, examples of the method of increasing the thickness of the carboxylic acid-modified nitrile-based copolymer latex include a method of adding a filler to the latex composition for dip molding. Due to the addition of a filler, an amount of the used carboxylic acid-modified nitrile-based copolymer latex for dip molding can be reduced, thereby reducing a preparation cost of the rubber gloves. However, when the filler is used in the latex composition for dip molding, a limitation where tensile strength of the rubber gloves is reduced may occur.

Accordingly, there is a continuous demand for developing a carboxylic acid-modified nitrile-based copolymer latex composition having excellent tensile strength.

DISCLOSURE OF THE INVENTION

Technical Problem

Accordingly, the present invention has been made in an effort to solve the aforementioned limitation of the prior art.

A first technical object of the present invention is to provide a carboxylic acid-modified nitrile-based copolymer latex composition which can be used to prepare a dip molded article having high tensile strength and excellent wearable sensation.

A second technical object of the present invention is to provide a dip molded article including the carboxylic acid-modified nitrile-based copolymer latex composition.

Technical Solution

According to an aspect of the present invention, there is provided a carboxylic acid-modified nitrile-based copolymer latex composition including: a carboxylic acid-modified nitrile-based copolymer latex having a glass transition temperature of −30 to −20° C.; and a bentonite dispersion solution.

According to another aspect of the present invention, there is provided a dip molded article including: the carboxylic acid-modified nitrile-based copolymer latex composition.

Advantageous Effects

A carboxylic acid-modified nitrile-based copolymer latex composition according to an embodiment of the present invention includes a carboxylic acid-modified nitrile-based copolymer latex having a certain glass transition temperature and a bentonite dispersion solution, and thus it is possible to prepare a dip molded article having high tensile strength and excellent wearable sensation.

MODE FOR CARRYING OUT THE INVENTION

Hereinafter, the present invention will be described in more detail to help understanding of the present invention.

Terms or words used in the present specification and claims should not be interpreted as being limited to typical or dictionary meanings, but should be interpreted as having meanings and concepts which comply with the technical spirit of the present invention, based on the principle that an inventor can appropriately define the concept of the term to describe his/her own invention in the best manner.

A carboxylic acid-modified nitrile-based copolymer latex composition according to an embodiment of the present invention includes a carboxylic acid-modified nitrile-based copolymer latex having a glass transition temperature (Tg) of −30 to −20° C., and a bentonite dispersion solution.

The carboxylic acid-modified nitrile-based copolymer latex composition according to an embodiment of the present invention includes the carboxylic acid-modified nitrile-based copolymer latex having the glass transition temperature of −30 to −20° C. and the bentonite dispersion solution, and thus it is possible to prepare a molded article having high tensile strength and excellent wearable sensation.

The carboxylic acid-modified nitrile-based copolymer latex composition according to an embodiment of the present invention may include the carboxylic acid-modified nitrile-based copolymer latex and the bentonite dispersion solution at a weight ratio of 99:1 to 95:5.

In the carboxylic acid-modified nitrile-based copolymer latex composition according to an embodiment of the present invention, in the case where the bentonite dispersion solution is present in an amount that is less than the aforementioned weight ratio, it may be difficult to improve tensile strength. Further, it is not preferable that the bentonite dispersion solution is present in an amount that is more than the aforementioned weight ratio because an elongation rate and tensile strength may be rapidly reduced.

Hereinafter, the carboxylic acid-modified nitrile-based copolymer latex and the bentonite dispersion solution included in the carboxylic acid-modified nitrile-based copolymer latex composition of the present invention will be described in detail.

1. Carboxylic Acid-Modified Nitrile-Based Copolymer Latex

In a carboxylic acid-modified nitrile-based copolymer latex composition according to an embodiment of the present invention, the glass transition temperature of the carboxylic acid-modified nitrile-based copolymer latex is −30 to −20° C., preferably −30 to −21° C., and more preferably −27 to −21° C.

It is not preferable that the glass transition temperature of the carboxylic acid-modified nitrile-based copolymer latex is less than −30° C. because tensile strength may be significantly reduced, and the glass transition temperature is more than −20° C. because cracks may be formed in a dip molded article.

The glass transition temperature of the carboxylic acid-modified nitrile-based copolymer latex may be measured by, for example, a differential scanning calorimetry.

Further, it is preferable that an average particle diameter ($D_{50}$) of the carboxylic acid-modified nitrile-based copolymer latex is 100 nm or more and 200 nm or less. If the average particle diameter of the carboxylic acid-modified nitrile-based copolymer latex is less than 100 nm, viscosity of the latex may be increased and the dip molded article may become transparent, which is not preferable. Meanwhile, it is not preferable that the average particle diameter is more than 200 nm, because productivity may be reduced when the carboxylic acid-modified nitrile-based copolymer latex is prepared due to the longer preparation time and tensile strength of a molded article may be reduced when the carboxylic acid-modified nitrile-based copolymer latex is applied to a dip molded article.

The average particle diameter ($D_{50}$) of the carboxylic acid-modified nitrile-based copolymer latex may be defined by a particle diameter on the basis of 50% of a particle diameter distribution, and may be measured by, for example, a laser scattering analyzer (Nicomp).

The carboxylic acid-modified nitrile-based copolymer latex according to an embodiment of the present invention may be obtained through emulsion polymerization using a monomer mixture including a conjugated diene-based monomer, an ethylenically unsaturated nitrile-based monomer, and an ethylenically unsaturated acid monomer.

Specifically, examples of the conjugated diene-based monomer of the monomers constituting the carboxylic acid-modified nitrile-based copolymer latex may include one or more selected from the group consisting of 1,3-butadiene, 2,3-dimethyl-1,3-butadiene, 2-ethyl-1,3-butadiene, 1,3-pentadiene, and isoprene. Among the examples, 1,3-butadiene and isoprene are preferable, and particularly, 1,3-butadiene may be most preferably used.

According to an embodiment of the present invention, the glass transition temperature of the carboxylic acid-modified nitrile-based copolymer latex, that is, −30 to −20° C., may be controlled depending on the content of the conjugated diene-based monomer.

The conjugated diene-based monomer may be included in an amount of 40 to 89 wt %, preferably 45 to 80 wt %, and most preferably 50 to 78 wt % based on the total weight of the monomers constituting the carboxylic acid-modified nitrile-based copolymer.

If the content of the conjugated diene-based monomer is less than 40 wt %, the dip molded article may be hardened and wearable sensation may become poor, and if the content is more than 89 wt %, oil resistance of the dip molded article may become poor and tensile strength may be reduced.

Further, examples of the ethylenically unsaturated nitrile-based monomer of the monomers constituting the carboxylic acid-modified nitrile-based copolymer latex may include one or more selected from the group consisting of acrylonitrile, methacrylonitrile, fumaronitrile, α-chloronitrile, and α-cyanoethylacrylonitrile. Among the examples, acrylonitrile, methacrylonitrile, or a mixture thereof is preferable, and particularly, acrylonitrile may be most preferably used.

The ethylenically unsaturated nitrile-based monomer may be included in an amount of 10 to 50 wt %, preferably 15 to 45 wt %, and most preferably 20 to 40 wt % based on the total weight of the monomers constituting the carboxylic acid-modified nitrile-based copolymer.

If the content of the ethylenically unsaturated nitrile-based monomer is less than 10 wt %, oil resistance of the dip molded article may become poor and tensile strength may be reduced, and if the content is more than 50 wt %, the dip molded article may be hardened and wearable sensation may become poor.

Meanwhile, the ethylenically unsaturated acid monomer of the monomers constituting the carboxylic acid-modified nitrile-based copolymer latex may include an ethylenically unsaturated monomer containing one or more acidic groups selected from the group consisting of a carboxylic group, a sulfonic acid group, and an acid anhydride group. Examples thereof may include an ethylenically unsaturated carboxylic acid monomer such as an acrylic acid, a methacrylic acid, an itaconic acid, a maleic acid, or a fumaric acid; polycarboxylic anhydride such as maleic anhydride or citraconic anhydride; an ethylenically unsaturated sulfonic acid monomer such as a styrene sulfonic acid; and an ethylenically unsaturated polycarboxylic acid partial ester monomer such as monobutyl fumarate, monobutyl maleate, or mono-2-hydroxypropyl maleate, or a mixture thereof. Among the examples, the methacrylic acid is particularly preferable. The ethylenically unsaturated acid monomer may be used in an alkali metal salt or ammonium salt form.

The ethylenically unsaturated acid monomer may be included in the content of 0.1 to 10 wt %, preferably 0.5 to 9 wt %, and most preferably 1 to 8 wt % based on the total weight of the monomers constituting the carboxylic acid-modified nitrile-based copolymer.

If the content of the ethylenically unsaturated acid monomer is less than 0.1 wt %, tensile strength of the dip molded article may be reduced, and if the content is more than 10 wt %, the dip molded article may be hardened and wearable sensation may become poor.

Optionally, the carboxylic acid-modified nitrile-based copolymer according to the present invention may further include other ethylenically unsaturated monomers that can be copolymerized with the ethylenically unsaturated nitrile monomer and the ethylenically unsaturated acid monomer. Specific examples thereof may include one or more selected from the group consisting of a vinyl aromatic monomer selected from the group consisting of styrene, alkyl styrene, and vinyl naphthalene; a fluoroalkylvinyl ether such as fluoroethylvinyl ether; an ethylenically unsaturated amide monomer selected from the group consisting of (metha)acrylamide, N-methylol (metha)acrylamide, N,N-dimethylol (metha)acrylamide, N-methoxymethyl (metha)acrylamide, and N-propoxymethyl (metha)acrylamide; a non-conjugated diene monomer such as vinylpyridine, vinylnorbornene, dicyclopentadiene, and 1,4-hexadiene; and an ethylenically unsaturated carboxylic acid ester monomer selected from the group consisting of methyl (metha)acrylate, ethyl (metha)acrylate, butyl (metha)acrylate, 2-ethylhexyl (metha)acrylate, trifluoroethyl (metha)acrylate, tetrafluoropropyl (metha)acrylate, dibutyl maleate, dibutyl fumarate, diethyl maleate, methoxymethyl (metha)acrylate, ethoxyethyl (metha)acrylate, methoxyethoxyethyl (metha) acrylate, cyanomethyl (metha)acrylate, 2-cyanoethyl (metha)acrylate, 1-cyanopropyl (metha)acrylate, 2-ethyl-6-cyanohexyl (metha)acrylate, 3-cyanopropyl (metha)acrylate, hydroxyethyl (metha)acrylate, hydroxypropyl (metha)acrylate, glycidyl (metha)acrylate, and dimethylaminoethyl (metha)acrylate.

Other ethylenically unsaturated monomers that can be copolymerized with the ethylenically unsaturated nitrile-based monomer and the ethylenically unsaturated acid monomer may be used in an amount of 20 wt % or less based on the total weight of the monomers constituting the carboxylic acid-modified nitrile-based copolymer, and if the amount is more than 20 wt %, a balance between soft wearable sensation and tensile strength may not be kept.

The carboxylic acid-modified nitrile-based copolymer latex according to an embodiment of the present invention may be prepared by adding an emulsifier, a polymerization initiator, and a molecular weight regulator to the monomers constituting the carboxylic acid-modified nitrile-based copolymer latex to perform emulsion polymerization.

Examples of the emulsifier, without particularly limitation, may include one or more selected from the group consisting of an anionic surfactant, a non-ionic surfactant, a cationic surfactant, and an ampholytic surfactant. Among the examples, particularly, an anionic surfactant selected from the group consisting of alkylbenzene sulfonates, aliphatic sulfonates, higher alcohol sulfuric acid ester salts, α-olefine sulfonates, and alkyl ether sulfuric acid ester salts may be preferably used.

According to an embodiment of the present invention, the average particle diameter of the carboxylic acid-modified nitrile-based copolymer latex may be controlled depending on the type or content of the emulsifier.

The emulsifier may be preferably used in an amount of 0.3 to 10 parts by weight, more preferably 0.8 to 8 parts by weight, and most preferably 1.5 to 6 parts by weight based on the total weight of the monomers constituting the carboxylic acid-modified nitrile-based copolymer.

If the amount of the emulsifier is less than 0.3 parts by weight, stability may be reduced during polymerization, and if the amount is more than 10 parts by weight, bubbles may be generated in a large amount, and thus there may be a limitation in that it is difficult to prepare the dip molded article.

The polymerization initiator is not particularly limited, but a radical initiator may be used. Examples of the radical initiator include one or more selected from the group consisting of inorganic peroxides such as sodium persulfates, potassium persulfates, ammonium persulfates, potassium superphosphates, or hydrogen peroxides; organic peroxides such as t-butyl peroxides, cumene hydroperoxides, p-menthane hydroperoxides, di-t-butyl peroxides, t-butylcumyl peroxides, acetyl peroxides, isobutyl peroxides, octanoyl peroxides, dibenzoyl peroxides, 3,5,5-trimethylhexanol peroxides, or t-butylperoxy isobutyrate; azobisisobutyronitrile, azobis-2,4-dimethylvaleronitrile, azobiscyclohexanecarbonitrile, and methyl azobisisobutyrates, and, among the radical initiators, inorganic peroxides are more preferable, and among the examples, potassium persulfates may be particularly preferably used.

The polymerization initiator may be preferably included in an amount of 0.01 to 2 parts by weight and more preferably 0.02 to 1.5 parts by weight based on the total weight of the monomers constituting the carboxylic acid-modified nitrile-based copolymer.

If the amount of the polymerization initiator is less than 0.01 parts by weight, a polymerization speed may be reduced, and thus it may be difficult to prepare the dip molded article, and if the amount is more than 2 parts by weight, the polymerization speed may be excessively increased, and thus it may be difficult to adjust polymerization.

Meanwhile, examples of the molecular weight regulator may include, without particularly limitation, mercaptans such as α-methylstyrene dimer, t-dodecyl mercaptan, n-dodecyl mercaptan, and octyl mercaptan; halogenated hydrocarbons such as carbon tetrachloride, methylene chloride, or methylene bromide; and sulfur-containing compounds such as tetraethylthiuram disulfide, dipentamethylenethiuram disulfide, or diisopropylxanthogen disulfide. The molecular weight regulators may be used alone or in combination of two or more. Among the examples, mercaptans are preferable, and t-dodecyl mercaptan may be more preferably used.

An amount of the used molecular weight regulator depends on types thereof, but may be preferably 0.1 to 2.0 parts by weight, more preferably 0.2 to 1.5 parts by weight, and most preferably 0.3 to 1.0 part by weight based on the total weight of the monomers constituting the carboxylic acid-modified nitrile-based copolymer.

If the amount of the molecular weight regulator is less than 0.1 parts by weight, physical properties of the dip molded article may be significantly reduced, and if the amount is more than 2 parts by weight, polymerization stability may be reduced.

According to an embodiment of the present invention, an activating agent may be added in addition to the aforementioned components, and examples of the activating agent may include one or more selected from the group consisting of sodiumformaldehyde sulfoxylate, sodiumethylenediamine tetraacetate, ferrous sulfate, dextrose, sodium pyrophosphate, and sodium sulfite.

Further, of course, when the carboxylic acid-modified nitrile-based copolymer latex of the present invention is polymerized, if necessary, side materials such as a chelating agent, a dispersant, a pH adjuster, a free oxygen absorber, a particle diameter adjuster, an aging resistor, and an oxygen scavenger may be added.

A method of adding the mixture of the monomers constituting the carboxylic acid-modified nitrile-based copolymer is not particularly limited, and any method may be used among a method of adding a monomer mixture at the same time to a polymerization reactor, a method of continuously adding a monomer mixture to a polymerization reactor, and a method of adding a portion of a monomer mixture to a polymerization reactor and continuously supplying a residual monomer to the polymerization reactor.

A polymerization temperature is not particularly limited during emulsion polymerization, but may be, for example, 10 to 90° C. and specifically 25 to 75° C. A conversion ratio when the polymerization reaction is stopped may be specifically 90% or more and more specifically 93% or more.

Meanwhile, a polymerization reaction stopper for stopping the polymerization reaction may be further added, and specific examples thereof may include isopropylhexylamine, diethylhydroxylamine, or sodium dimethyldithiocarbamate. However, in the case where isopropylhydroxyamine or diethylhydroxyamine is used, a color of a final latex may be changed, and thus, preferably, sodium dimethyldithiocarbamate may be used. An unreacted monomer may be removed and a solid concentration and a pH may be adjusted to obtain the carboxylic acid-modified nitrile-based copolymer latex.

According to an embodiment of the present invention, in views of physical properties of the dip molded article of the present invention, it is preferable that in the carboxylic acid-modified nitrile-based copolymer latex composition, the carboxylic acid-modified nitrile-based copolymer latex may be included in a content of 80 to 99 wt %, preferably 85 to 98 wt %, and most preferably 88 to 97 wt % based on the total weight of the entire composition.

2. Bentonite Dispersion Solution

In the carboxylic acid-modified nitrile-based copolymer latex composition according to an embodiment of the present invention, the content of the bentonite dispersion solution may affect tensile strength and wearable sensation of the dip molded article including the carboxylic acid-modified nitrile-based copolymer latex composition.

The bentonite dispersion solution may be used at a weight ratio of 1 to 5 based on the carboxylic acid-modified nitrile-based copolymer latex. It is not preferable the weight ratio of the bentonite dispersion solution is less than the aforementioned weight ratio, because it may be difficult to improve tensile strength, and the weight ratio of the bentonite dispersion solution is more than the aforementioned weight ratio, because an elongation rate may be rapidly reduced and tensile strength may be rapidly reduced.

In the carboxylic acid-modified nitrile-based copolymer latex composition according to an embodiment of the present invention, the bentonite dispersion solution may be basically present in a form where bentonite is dispersed in a solution, particularly water. The bentonite dispersion solution may be used by dispersing bentonite in a content of 1 to 20 parts by weight, and preferably 1 to 10 parts by weight based on 100 parts by weight of the solution. In the case where bentonite is dispersed in an amount that is more than 20 parts by weight in water to be used, viscosity of the solution may be increased, and thus dispersion may not be well performed. Meanwhile, in the case where the amount is less than 1 part by weight, it may be difficult to adjust the concentration of the carboxylic acid-modified nitrile-based copolymer latex composition.

The bentonite dispersion solution may be dispersed by using glass beads, for example, a ball mill for 24 hours, and an average particle diameter of bentonite dispersed in the dispersion solution may be controlled by the ball mill.

According to an embodiment of the present invention, it is preferable that the bentonite dispersion solution includes bentonite having the average particle diameter of 500 nm or more and preferably 1000 to 3000 nm. In the case where the average particle diameter of bentonite is less than 500 nm, when bentonite is mixed with the carboxylic acid-modified nitrile-based copolymer latex, stability of the latex may be reduced, and thus cracks may be formed in the dip molded article.

The average particle diameter ($D_{50}$) of bentonite may be defined by a particle diameter on the basis of 50% of a particle diameter distribution, and may be measured by, for example, a laser scattering analyzer (Nicomp).

3. Other Additives

According to an embodiment of the present invention, the carboxylic acid-modified nitrile-based copolymer latex composition may further include one or more additives selected from the group consisting of a vulcanizing agent, an ionic cross-linking agent, a pigment, a thickener, and a pH adjuster.

An additive typically known in the art may be used as the additive such as a vulcanizing agent, a ionic cross-linking agent, a pigment, a thickener, and a pH adjuster, but not particularly limited thereto.

A solid concentration of the carboxylic acid-modified nitrile-based copolymer latex composition of the present invention may be preferably 10 to 40 wt %, more preferably 15 to 35 wt %, and most preferably 18 to 33 wt %.

Meanwhile, the pH of the carboxylic acid-modified nitrile-based copolymer latex composition of the present invention may be preferably 8.0 to 12, more preferably 9 to 11, and most preferably 9.3 to 10.5.

Further, the present invention may include a dip molded article including the carboxylic acid-modified nitrile-based copolymer latex composition. The dip molded article may be obtained by dip molding the carboxylic acid-modified nitrile-based copolymer latex composition.

A typical method may be used as a dip molding method for obtaining the dip molded article of the present invention. Examples thereof may include a direct immersion method, an anode adhesion immersion method, and a Teague adhesion immersion method. Among the examples, the anode adhesion immersion method is preferable because of an advantage that a dip molded article having a uniform thickness may be easily obtained.

Hereinafter, a method of preparing the dip molded article by using the carboxylic acid-modified nitrile-based copolymer latex composition of the present invention will be described in detail.

(a) Step of Attaching a Coagulant to a Surface of a Dip Molding Frame by Dipping the Dip Molding Frame Having a Hand Shape in a Coagulant Solution Examples of the coagulant include metal halides such as barium chloride, calcium chloride, magnesium chloride, zinc chloride, and aluminum chloride; nitrates such as barium nitrate, calcium nitrate, and zinc nitrate; acetates such as barium acetate, calcium acetate, and zinc acetate; and sulfates such as calcium sulfate, magnesium sulfate, and aluminum sulfate. Among the examples, calcium chloride and calcium nitrate are preferable. The coagulant solution is a solution including the coagulant dissolved in water, alcohol, or a mixture thereof. The concentration of the coagulant in the coagulant solution may be normally 5 to 50 wt % and specifically 15 to 40 wt %.

(b) Step of Immersing the Dip Molding Frame to which the Coagulant is Attached in the Carboxylic Acid-Modified Nitrile-Based Copolymer Latex Composition to Form a Dip Molded Layer The dip molding frame to which the coagulant is attached may be immersed in the carboxylic acid-modified nitrile-based copolymer latex composition according to an embodiment of the present invention, and then drawn out to form the dip molded layer in the dip molding frame.

(c) Step of Performing Heat Treatment of the Dip Molded Layer Formed in the Dip Molding Frame to Obtain the Dip Molded Article During the heat treatment, a water component may be firstly vaporized and curing may be then performed through cross-linking. Subsequently, the dip molded layer cross-linked due to the heat treatment may be peeled from the dip molding frame to obtain the dip molded article.

Further, according to an embodiment of the present invention, the dip molded article may be applied to, for example, dip molded latex articles such as surgical gloves, checkup gloves, a condom, a catheter, industrial gloves, household gloves, or health care articles.

Examples will be given hereinafter to help understanding of the present invention, but the following Examples have been described in an illustrative manner, and it is to be understood that various modifications and amendments will be apparent to those skilled in the art without departing from the scope and spirit of the invention, and the modifications and the amendments naturally fall into the scope of the appended claims.

EXAMPLE

<Preparation of Carboxylic Acid-Modified Nitrile-Based Copolymer Latex>

Preparation Example 1

After a 10 L high pressure reactor equipped with an agitator, a thermometer, a cooler, and an inlet for nitrogen gas, and provided to continuously add a monomer, an emulsifier, and a polymerization reaction initiator was substituted with nitrogen, 2.5 parts by weight of sodium alkylbenzenesulfonate, 0.5 parts by weight of t-dodecyl mercaptan, and 140 parts by weight of ion exchanged water were added based on 100 parts by weight of the monomer mixture of 25 wt % of acrylonitrile, 70 wt % of 1,3-butadiene, and 5 wt % of the methacrylic acid, and the temperature was increased to 40° C.

After the temperature was increased, 0.25 parts by weight of potassium persulfate, which is a polymerization initiator, was added, and when the conversion ratio reached 95%, 0.1 parts by weight of sodiumdimethyldithio carbamate was added to stop polymerization. An unreacted monomer was removed through the deodorization process, and ammonia water, the antioxidant, and an antifoaming agent were added to obtain a carboxylated acrylonitrile-butadiene-based copolymer latex having the solid concentration of 45%, the pH of 8.5, and the glass transition temperature of −26.7° C.

Preparation Example 2

A carboxylic acid-modified nitrile-based copolymer latex having the glass transition temperature of −21.4° C. was prepared by performing the same method as Preparation Example 1, except that a monomer mixture of 31.4 wt % of acrylonitrile, 62.3 wt % of 1,3-butadiene, and 6.3 wt % of the methacrylic acid was used.

Preparation Example 3

A carboxylic acid-modified nitrile-based copolymer latex having the glass transition temperature of −23.1° C. was prepared by performing the same method as Preparation Example 1, except that a monomer mixture of 31 wt % of acrylonitrile, 62.2 wt % of 1,3-butadiene, and 6.8 wt % of the methacrylic acid was used.

Preparation Example 4

A carboxylic acid-modified nitrile-based copolymer latex having the glass transition temperature of −31.4° C. was prepared by performing the same method as Preparation Example 1, except that a monomer mixture of 27 wt % of acrylonitrile, 66 wt % of 1,3-butadiene, and 7 wt % of the methacrylic acid was used.

Preparation Example 5

A carboxylic acid-modified nitrile-based copolymer latex having the glass transition temperature of −18.28° C. was prepared by performing the same method as Preparation Example 1, except that a monomer mixture of 30.5 wt % of acrylonitrile, 63 wt % of 1,3-butadiene, and 6.5 wt % of the methacrylic acid was used.

The carboxylic acid-modified nitrile-based copolymer latex having the glass transition temperature described in the following Table 1 was prepared by changing the content of the monomer.

Further, physical properties of the carboxylated acrylonitrile-butadiene-based copolymer latex are described in the following Table 1.

TABLE 1

| | Average particle diameter (nm) | 130° C. Gel (%) | Room temperature Gel (%) | Glass transition temperature (Tg) (° C.) | Surface tension (mN/m) | Molecular weight (kDa) |
|---|---|---|---|---|---|---|
| Preparation Example 1 | 119.2 | 41.1 | 5 | −26.7 | 32.5 | 158 |
| Preparation Example 2 | 121.7 | 78.4 | 54.3 | −21.4 | 43.93 | 90 |
| Preparation Example 3 | 121.5 | 50.36 | 1.69 | −23.1 | 34.79 | 144 |
| Preparation Example 4 | 121.1 | 78.4 | 76.1 | −31.4 | 43.93 | 90 |
| Preparation Example 5 | 132.0 | 78.34 | 49.84 | −18.28 | 39.83 | 55 |

Preparation Example 6

Preparation of Bentonite Dispersion Solution 8 parts by weight of bentonite was used and dispersed in water based on 100 parts by weight of water. The dispersion solution in which bentonite was dispersed was dispersed by the ball mill using glass beads for 24 hours. In this case, the average particle diameter of bentonite was 2045.7 nm.

<Preparation of Carboxylic Acid-Modified Nitrile-Based Copolymer Latex Composition>

Example 1

99 weight ratio of the carboxylated acrylonitrile-butadiene-based copolymer latex prepared in Preparation Example 1, 1 weight ratio of the bentonite dispersion solution prepared in Preparation Example 6, 1.6 parts by weight of the 1.25% potassium hydroxide solution, and an appropriate amount of secondary distilled water were added, and 1 part by weight of titanium oxide, 1.25 parts by weight of zinc oxide, 1 part by weight of sulfur, and 0.5 parts by weight of the sulfur cross-lining promoting agent were mixed to obtain a carboxylic acid-modified nitrile-based copolymer latex composition having the solid concentration of 18% and the pH of 9.8.

Example 2

Ae carboxylic acid-modified nitrile-based copolymer latex composition was obtained by performing the same method as Example 1, except that 97 weight ratio of the carboxylated acrylonitrile-butadiene-based copolymer latex prepared in Preparation Example 1; and 3 weight ratio of the bentonite dispersion solution prepared in Preparation Example 6 were used.

Example 3

A carboxylic acid-modified nitrile-based copolymer latex composition was obtained by performing the same method as Example 1, except that 95 weight ratio of the carboxylated acrylonitrile-butadiene-based copolymer latex prepared in Preparation Example 1; and 5 weight ratio of the bentonite dispersion solution prepared in Preparation Example 6 were used.

Examples 4 and 5

A carboxylic acid-modified nitrile-based copolymer latex composition was obtained by performing the same method as Example 1, except that the carboxylated acrylonitrile-butadiene-based copolymer latex prepared in Preparation Examples 2 and 3 was used.

Comparative Example 1

A carboxylic acid-modified nitrile-based copolymer latex composition was obtained by performing the same method as Example 1, except that the bentonite dispersion solution was not added.

Comparative Example 2

A carboxylic acid-modified nitrile-based copolymer latex composition was obtained by performing the same method as Example 1, except that 94 parts by weight of the carboxylated acrylonitrile-butadiene-based copolymer latex prepared in Preparation Example 1; and 6 parts by weight of the bentonite dispersion solution prepared in Preparation Example 6 were used.

Comparative Example 3

A carboxylic acid-modified nitrile-based copolymer latex composition was obtained by performing the same method as Example 1, except that 99.5 parts by weight of the carboxylated acrylonitrile-butadiene-based copolymer latex prepared in Preparation Example 1; and 0.5 parts by weight of the bentonite dispersion solution prepared in Preparation Example 6 were used.

Comparative Examples 4 and 5

A carboxylic acid-modified nitrile-based copolymer latex composition was obtained by performing the same method as Example 1, except that the carboxylated acrylonitrile-butadiene-based copolymer latex prepared in Preparation Examples 4 and 5 was used.
<Preparation Of Dip Molded Article>

Example 6

18 parts by weight of calcium nitrate, 81.9 parts by weight of distilled water, and 0.1 parts by weight of a wetting agent (Teric 320 produced by Huntsman Corporation, Australia) were mixed to prepare a coagulant solution. A ceramic mold having the hand shape was dipped in the solution for 10 seconds, drawn, and dried at 80° C. for 4 minutes to apply the coagulant on the mold having the hand shape.

Next, the mold, to which the coagulant was applied, was dipped in the carboxylic acid-modified nitrile-based copolymer latex composition prepared in Example 1 for 10 seconds, pulled up, dried at 80° C. for 2 minutes, and dipped in water or hot water for 1 minute. The mold was dried again at 80° C. for 3 minutes, and then cross-linked at 90° C. for 20 minutes. The cross-linked dip molded layer was peeled from the mold having the hand shape to obtain the dip molded article having the glove shape.

Examples 7 to 10

A dip molded article was obtained by performing the same method as Example 6, except that the carboxylic acid-modified nitrile-based copolymer latex compositions prepared in Examples 2 to 5 were used.

Comparative Examples 6 to 10

A dip molded article was obtained by performing the same method as Example 6, except that the carboxylic acid-modified nitrile-based copolymer latex compositions prepared in Comparative Examples 1 to 5 were used.

Experimental Example 1

Measurement of Physical Properties of Carboxylic Acid-Modified Nitrile-Based Copolymer Latex Composition The pH, surface tension (Sigma702, KSV), and the average particle diameter (Laser Scattering Analyzer, Nicomp) of the carboxylic acid-modified nitrile-based copolymer latex compositions prepared in Examples 1 to 3 and Comparative Example 1 were measured, and the results are described in the following Table 2.

TABLE 2

| | pH | Surface tension (mN/m) | Average particle diameter (nm) |
|---|---|---|---|
| Example 1 | 9.83 | 34.19 | 143.5 |
| Example 2 | 9.80 | 33.99 | 141.3 |
| Example 3 | 9.80 | 33.83 | 142.6 |
| Comparative Example 1 | 9.83 | 34.15 | 142.3 |

As seen in Table 2, it can be found that in Examples 1 to 3 using the bentonite dispersion solution, there is no significant change in pH, surface tension, and average particle diameter as compared to Comparative Example 1 in which the bentonite dispersion solution was not used.

This shows that the bentonite dispersion solution can be used while not affecting safety and workability of the carboxylic acid-modified nitrile-based copolymer latex composition.

Experimental Example 2

Measurement of Physical Properties of Dip Molded Article

The thickness (mm), the max load (N), tensile strength (MPa), the elongation rate (%), stress (MPa) at 300%, and stress (MPa) at 500% of the dip molded articles obtained in Examples 6 to 10 and Comparative Examples 6 to 10 were measured.

Max Load (N)

According to the ASTM D638 method, the max load (N) was obtained by: drawing the specimen at the cross head speed of 500 mm/min; measuring the point at which the specimen was cut; and measuring external force applied to the specimen at the time when the specimen was cut by using U.T.M (Instron, model name; 4466) which is a test equipment.

Measurement of Tensile Strength

According to the ASTM D638 method, the specimen was drawn at the cross head speed of 500 mm/min and the point at which the specimen was cut was then measured by using U.T.M (Instron, model name; 4466) which is a test equipment. Tensile strength was calculated by the following Equation:

Tensile strength (kgf/mm$^2$)=load value (kgf)/thickness (mm)×width (mm)

Measurement of Elongation Rate

According to the ASTM D638 method, the specimen was drawn at the cross head speed of 500 mm/min and the point at which the specimen was cut was then measured by using U.T.M, and the elongation rate was calculated by the following Equation:

Elongation rate (%)=length after elongation/initial length×100

Stress (MPa) at 300% and Stress (MPa) at 500%

According to the ASTM D638 method, the specimen was drawn at the cross head speed of 500 mm/min by using U.T.M (Instron, model name; 4466) which is a test equipment and stress at 300% and stress at 500% were measured by the following Equation:

Stress at 300% (MPa)=tensile strength when the specimen is elongated by three times than the initial length of the specimen (1 MPa=0.10197 kgf/mm$^2$)

Stress at 500% (MPa)=tensile strength when the specimen is elongated by five times than the initial length of the specimen (1 MPa=0.10197 kgf/mm$^2$)

TABLE 3

|  | Thickness (mm) | Max load (N) | Tensile strength (MPa) | Elongation rate (%) | Stress at 300% (MPa) | Stress at 500% (MPa) |
| --- | --- | --- | --- | --- | --- | --- |
| Example 6 | 0.068 | 15.183 | 37.144 | 644.235 | 4.713 | 12.016 |
| Example 7 | 0.071 | 14.379 | 33.854 | 630.544 | 5.239 | 12.996 |
| Example 8 | 0.074 | 14.271 | 31.953 | 618.091 | 6.194 | 14.685 |
| Example 9 | 0.066 | 11.342 | 28.55 | 542.112 | 4.409 | 17.638 |
| Example 10 | 0.057 | 10.658 | 31.164 | 492.078 | 7.323 | 32.725 |
| Comparative Example 6 | 0.070 | 14.535 | 34.597 | 635.308 | 4.127 | 11.242 |
| Comparative Example 7 | 0.070 | 11.983 | 28.31 | 570.65 | 3.769 | 12.834 |
| Comparative Example 8 | 0.057 | 10.568 | 31.164 | 492.078 | 7.323 | 32.725 |
| Comparative Example 9 | 0.070 | 13.734 | 32.900 | 455.152 | 8.792 | — |
| Comparative Example 10 | 0.069 | 11.059 | 25.774 | 562.337 | 3.283 | 12.368 |

As seen in Table 3, in Example 6 using the bentonite dispersion solution, the thickness was not further increased and the elongation rate was not reduced as compared to Comparative Example 1 in which the bentonite dispersion solution was not used.

In the case of Example 6, tensile strength of the glove specimen is higher than that of Comparative Example 6 by 10% or more without a reduction in basic physical properties such as the elongation rate.

Meanwhile, in the case where the amount of the used bentonite dispersion solution is increased like Examples 8 and 9, all physical properties of the glove are reduced. This is because bentonite absorbs water, which is a medium between latex particles when forming a film of gloves, due to the hygroscopic property of bentonite. In the case where the amount of bentonite is less than 1 part by weight, as the result shown in Comparative Example 8, tensile strength of the glove is reduced. Accordingly, it can be found that there is an appropriate content of bentonite required to improve tensile strength of the glove. Therefore, in the case where the amount of bentonite to be contained in the latex composition for dip molding is 1 part by weight, it is possible to prepare the glove having excellent physical properties.

Meanwhile, as shown in Table 3, it can be found that tensile strength of the glove made using 1 part by weight of bentonite is affected by the glass transition temperature of the carboxylic acid-modified nitrile-based copolymer latex.

That is, in the case where the carboxylic acid-modified nitrile-based copolymer latex having the glass transition temperature of −30 to −20° C. like Examples 6 to 10 was used, all of tensile strength, the elongation rate, and stress were excellent. On the contrary, in Comparative Example 9 having the glass transition temperature of −31.4° C., the elongation rate was reduced by about 20% or more and stress was not good as compared to the Examples. Meanwhile, it can be examined that in the case of Comparative Example 10 having the glass transition temperature of −18.28° C., both tensile strength and the elongation rate are low.

Therefore, from the result of Table 3, it can be found that it is possible to prepare the glove having excellent tensile strength by using the carboxylic acid-modified nitrile-based copolymer latex having the glass transition temperature of −30 to −20° C. and the bentonite dispersion solution.

While this invention has been particularly shown and described with reference to preferred embodiments thereof and drawings, it will be understood by those skilled in the art that various changes in form and details may be made therein without departing from the spirit and scope of the invention as defined by the appended claims.

The invention claimed is:

1. A carboxylic acid-modified nitrile-based copolymer latex composition comprising:
   a carboxylic acid-modified nitrile-based copolymer latex having a glass transition temperature of −30 to −20° C.; and
   a bentonite dispersion solution,
   wherein the carboxylic acid-modified nitrile-based copolymer latex is formed by polymerizing a monomer mixture including 62.2 to 70 wt % of 1,3 butadiene, 25 to 31.4 wt % of acrylonitrile, and 5 to 6.8 wt % of methacrylic acid based on a total weight of monomers constituting the carboxylic acid-modified nitrile-based copolymer,
   wherein the carboxylic acid-modified nitrile-based copolymer latex and the bentonite dispersion solution are included at a weight ratio of 99:1 to 95:5,
   wherein in the bentonite dispersion solution, 1 to 8 parts by weight of bentonite is dispersed based on 100 parts by weight of a solution, and wherein bentonite is present in an amount ranging from 0.022 to 0.87 parts by weight based on 100 parts by weight of dried carboxylic acid-modified nitrile-based copolymer latex.

2. The composition of claim 1, wherein the carboxylic acid-modified nitrile-based copolymer latex has an average particle diameter of 100 nm or more and 200 nm or less.

3. The composition of claim 1, wherein the bentonite dispersion solution includes bentonite having an average particle diameter of 500 nm or more.

4. The composition of claim 1, further comprising:
one or more additives selected from the group consisting of a vulcanizing agent, an ionic cross-linking agent, a pigment, a thickener, and a pH adjuster.

5. The composition of claim 1, wherein bentonite is present in an amount ranging from 0.022 to 0.17 parts by weight based on 100 parts by weight of dried carboxylic acid-modified nitrile-based copolymer latex.

6. A dip molded article comprising the carboxylic acid-modified nitrile-based copolymer latex composition according to claim 1.

7. The dip molded article of claim 6, wherein the dip molded article is a dip molded latex article such as surgical gloves, checkup gloves, a condom, a catheter, industrial gloves, household gloves, or health care articles.

* * * * *